United States Patent
Duclo

Patent Number: 5,254,041
Date of Patent: Oct. 19, 1993

[54] V-DRIVE CLUTCH ASSEMBLY

[76] Inventor: Marley J. Duclo, P.O. Box 730, Hotchkiss, Colo. 81419

[21] Appl. No.: 967,104

[22] Filed: Oct. 26, 1992

[51] Int. Cl.$^5$ ............................................. F16H 55/00
[52] U.S. Cl. ........................................................ 474/14
[58] Field of Search ................................. 474/11–14, 474/69, 70, 46

[56] References Cited

U.S. PATENT DOCUMENTS

| | | | |
|---|---|---|---|
| 3,986,406 | 10/1976 | Prasad | 474/14 |
| 4,052,908 | 10/1977 | Takagi et al. | 474/14 |
| 4,095,479 | 6/1978 | Lundberg | 474/14 X |
| 4,575,363 | 3/1986 | Burgess et al. | 474/14 |

Primary Examiner—Thuy M. Bui
Attorney, Agent, or Firm—Donald W. Erickson

[57] ABSTRACT

A V-drive clutch assembly for a V-belt driven vehicle is described. The V-drive clutch assembly includes a fixed sheave plate for mounting on the drive shaft of the vehicle, a movable sheave plate assembly, a cam follower assembly, a neutral retainer coil spring under tension and a bearing plate. The weight arms of the cam follower assembly are disposed radially relative to the axis of the drive shaft. The clutch is characterized by cool running and light weight.

4 Claims, 4 Drawing Sheets

V-DRIVE CLUTCH ASSEMBLY

BACKGROUND OF THE INVENTION

The present invention relates to a clutch assembly useful for driving the V-belt of a power transmission assembly found in snowmobiles, all terrain vehicles (ATV) and motorbikes. Examples of such clutch assemblies are shown in Lundberg U.S. Pat. No. 4,095,479, issued Jun. 20, 1978, and prior art cited therein.

In V-belt drive clutch assemblies presently known, the clutch assembly after running for a few minutes gets very hot. This leads to deterioration of the clutch components, surrounding elements and presents a danger of burning to the user or mechanic. Another disadvantage of presently known clutches is the lack of efficiency in the transmission of power relative to the rate of speed of the vehicle's engine. A further disadvantage of presently known V-belt drive clutches is that the clutches are very complex to manufacture and very difficult and expensive to service. The present invention overcomes the aforementioned and other disadvantages of the prior art V-belt clutch assemblies.

SUMMARY OF THE INVENTION

The V-belt drive clutch assembly of the present invention is characterized by cool running. In other words, the clutch assembly does not get hot to the touch when in operation. Also, it is very efficient in the transmission of power relative to the speed of the vehicle's engine. The clutch of the present invention is of the drive sheave type responsive to the speed of the engine. It includes radially disposed weight arms pivotally connected at one end to a retainer ring of the cam follower assembly (spider) and the other end of the arms linked to the shift cams of the movable sheave plate. The weight arms are responsive to speed. As the speed increases, the movable sheave plate axially moves toward the stationary or fixed sheave plate to engage the V-belt The shift cams are positioned on the perimeter of the rear or concave side of the movable sheave plate. For the neutral or idle position of the clutch, the movable sheave plate is spaced away from the fixed sheave by means of a coil spring mounted on a shaft attached to the fixed sheave plate. The tension or compression of the coil spring is responsive to the torque of the rotation of the camming members to enable the sheave plates to contact and drive the V-belt.

DETAILED DESCRIPTION OF THE INVENTION

Figure 1:
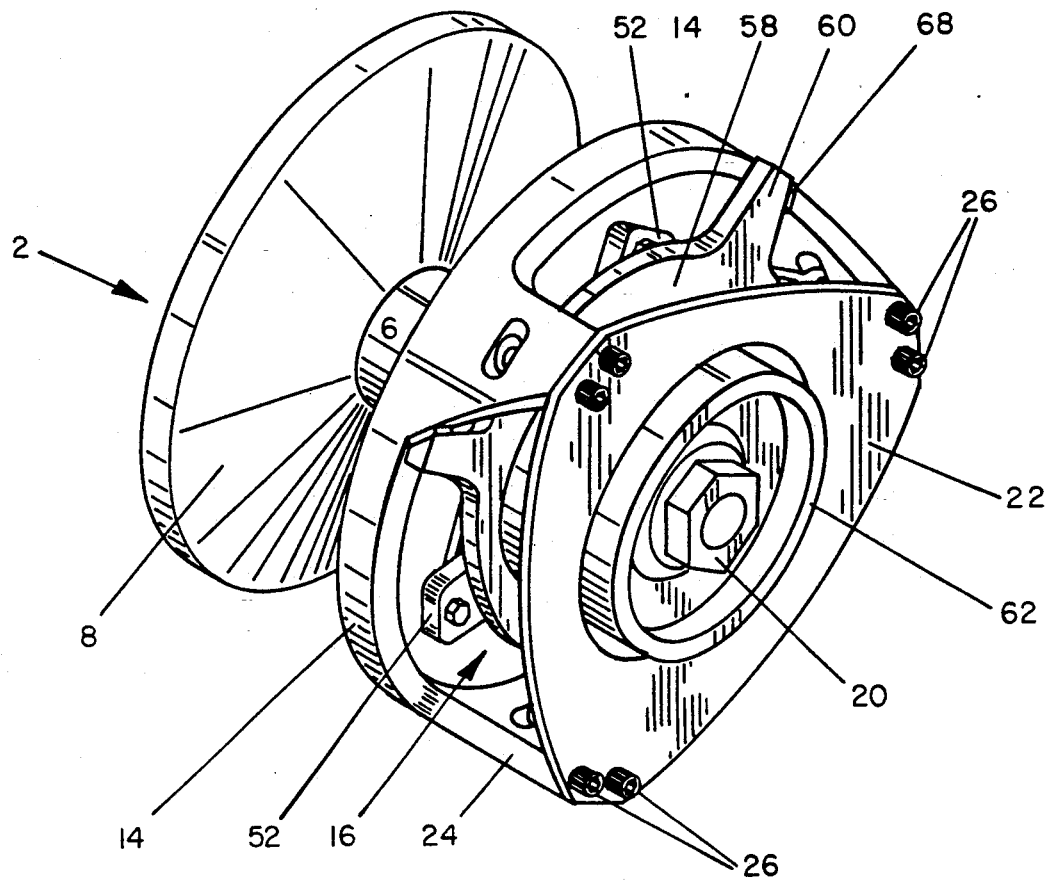
FIG. 1 is a front and left side perspective view of an assembled clutch in accordance with the present invention.
Figure 3:
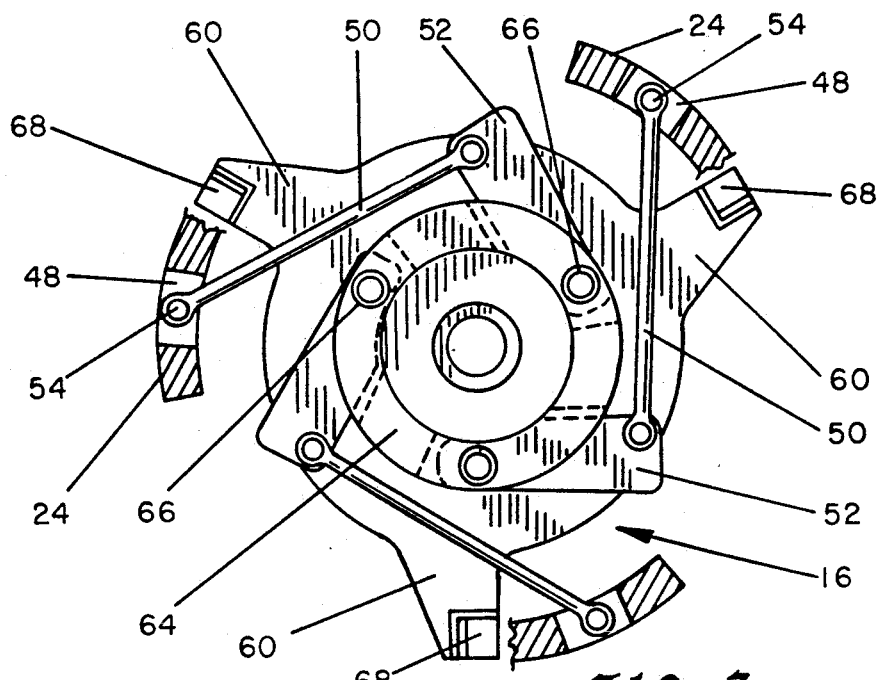
FIG. 3 is a rear elevation view of the spider or cam follower assembly of the clutch of FIG. 1.
Figure 4:
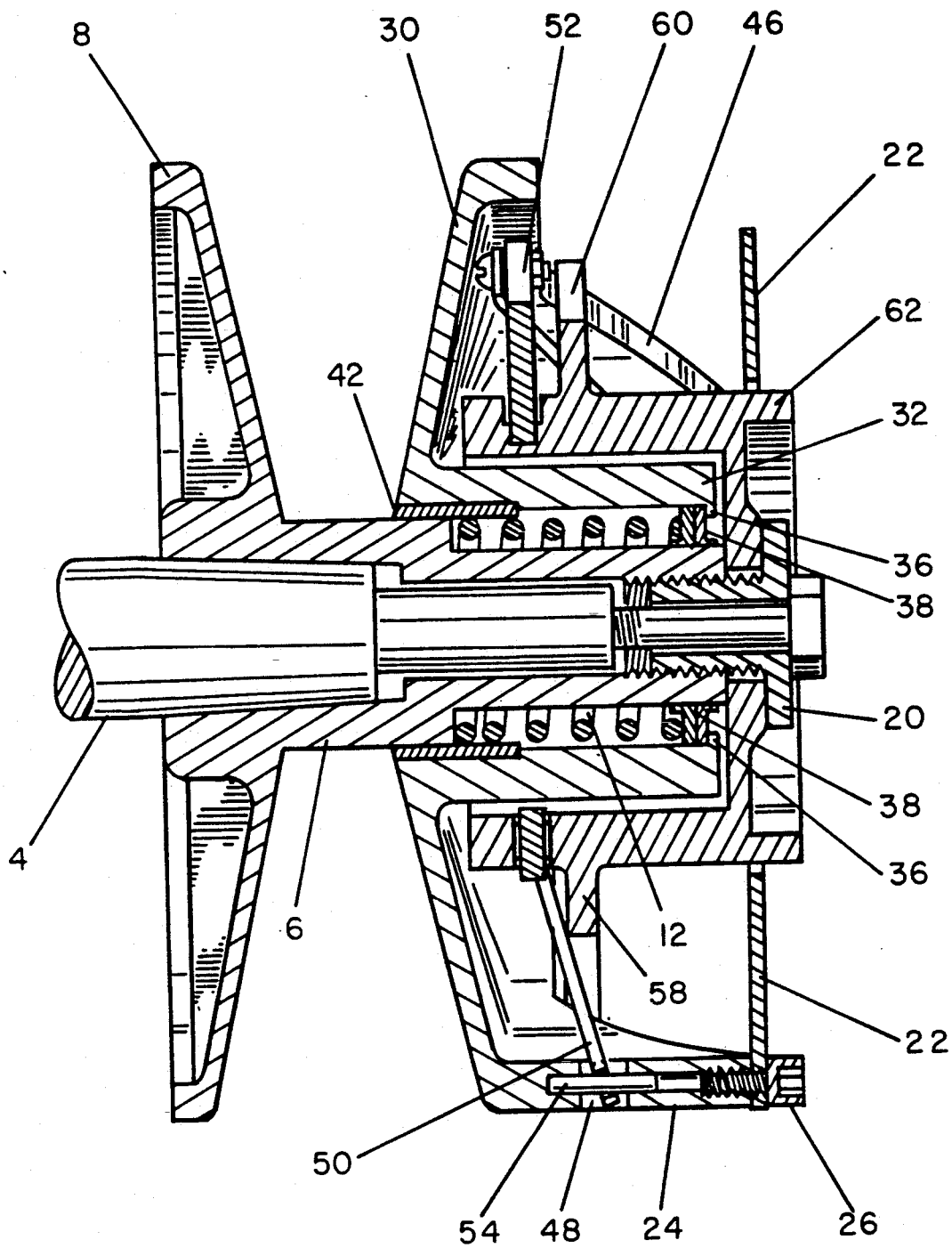
FIG. 4 is a cross-sectional view, slightly exploded, of the clutch of FIG. 1.

With reference to the drawings, there is shown in FIG. 1, an assembled clutch of the present invention designated generally at 2. The clutch is in the idle or neutral position as shown in FIG. 1. The clutch is mounted directly on the drive shaft 4, as shown in FIG. 4, of the vehicle via a bore in the belt idler support member 6 of the stationary or fixed sheave plate 8. The sheave 8 is fixed to support member 6 and is incapable of axial movement relative to the axis of shaft 4. As an extension of support member 6, or as an integral part thereof, is hollow shaft member 10 which is of sufficient length and diameter to accommodate and support neutral retainer coil spring 12, movable sheave plate assembly 14 and the spider or cam follower assembly 16. The outer tapered end of shaft 10 is threaded internally, as at 18, to receive the threaded bolt 20. Bolt 20 in cooperation with shaft 10 and cover or bearing plate 22 holds the clutch assembly together. Plate 22 is fastened to the outer end of shift cams 24 of the movable sheave plate assembly using bolts 26. Shaft 10 is reduced in diameter as compared to belt support member 6 to form a shoulder 28 for seating spring 12. In the embodiment shown the shaft 10 has an outside diameter (O.D.) of 1 $\frac{1}{8}$", inside diameter (I.D.) of 15/16" and support member an O.D. of 1 $\frac{1}{4}$" and I.D. of 1 3/16". The length of the shaft is 3$\frac{1}{4}$" and the support member is 1 $\frac{1}{8}$". The O.D. of sheave plates 8 and 30 is 7 $\frac{1}{4}$".

The movable sheave plate assembly 14 includes the convex surfaced sheave 30, shift cams 24 and a centrally positioned hub 32 fixed at its base to the concave surface 34 of the sheave plate. The hub has O.D. of 2$\frac{1}{2}$", I.D. of 1 $\frac{1}{4}$" and length of 2 $\frac{1}{8}$" from the concave surface of the sheave. At the outer end of hub 32, there is provided a small internal lip 36 for retaining bushing rings 38 and 40 which receive shaft 10 and retain the outer end 12A of coil spring 12. As best seen in FIG. 4, the hub cooperatively slides over spring 12 and support member 6 for axial and rotatable movement therewith. Centrally positioned in sheave 30 is a brass bushing or sleeve 42 which has an I.D. slightly smaller than the I.D. of hub 32 and slightly larger than the O.D. of support member 6. This enables the sheave plate assembly 14 to slightly move laterally toward or away from sheave plate 8 to engage or disengage the V-belt (not shown). and to rotate around said support member 6. The bushing 42 shown has a width of $\frac{1}{8}$".

The shift cams 24 are fixed to and around the periphery of the sheave plate 30 and project outward and away from the concave surface of the sheave plate. In the embodiment shown, three cams 24 are used. There can also be used two, four or more cams. The cams are equally spaced around the perimeter of the sheave plate 30 and the outer surface of the cams are near the perimeter surface and rim 44 of the sheave plate. The cams extend out 2" from rim 44 which itself is $\frac{1}{8}$" as measured from the perimeter of sheave plate 30. The ramp 46 (or sloped part) of the cam is at an angle of about 45 degrees, relative to the base thereof, in the embodiment shown. Generally, the angle will be from about 35 to 50 degrees. Within and near the base, centrally positioned, of each shift cam is a slot 48 for receiving the outer end of link rod 50 of the radially disposed weight arm 52. The link rod is pivotally held in place by pivot pin 54 which is inserted via hole 56 in the outer end of the shift cam. The link rod shown is about 4 $\frac{1}{8}$" long. In place of the link rod, other attachment means can be used such as a cable or chain.

The cam follower assembly 16, which is sometimes called the spider, includes a weight arm retainer ring 57, drive lug plate 58 with drive lugs 60, and a drive cap 62.

Figure 2:
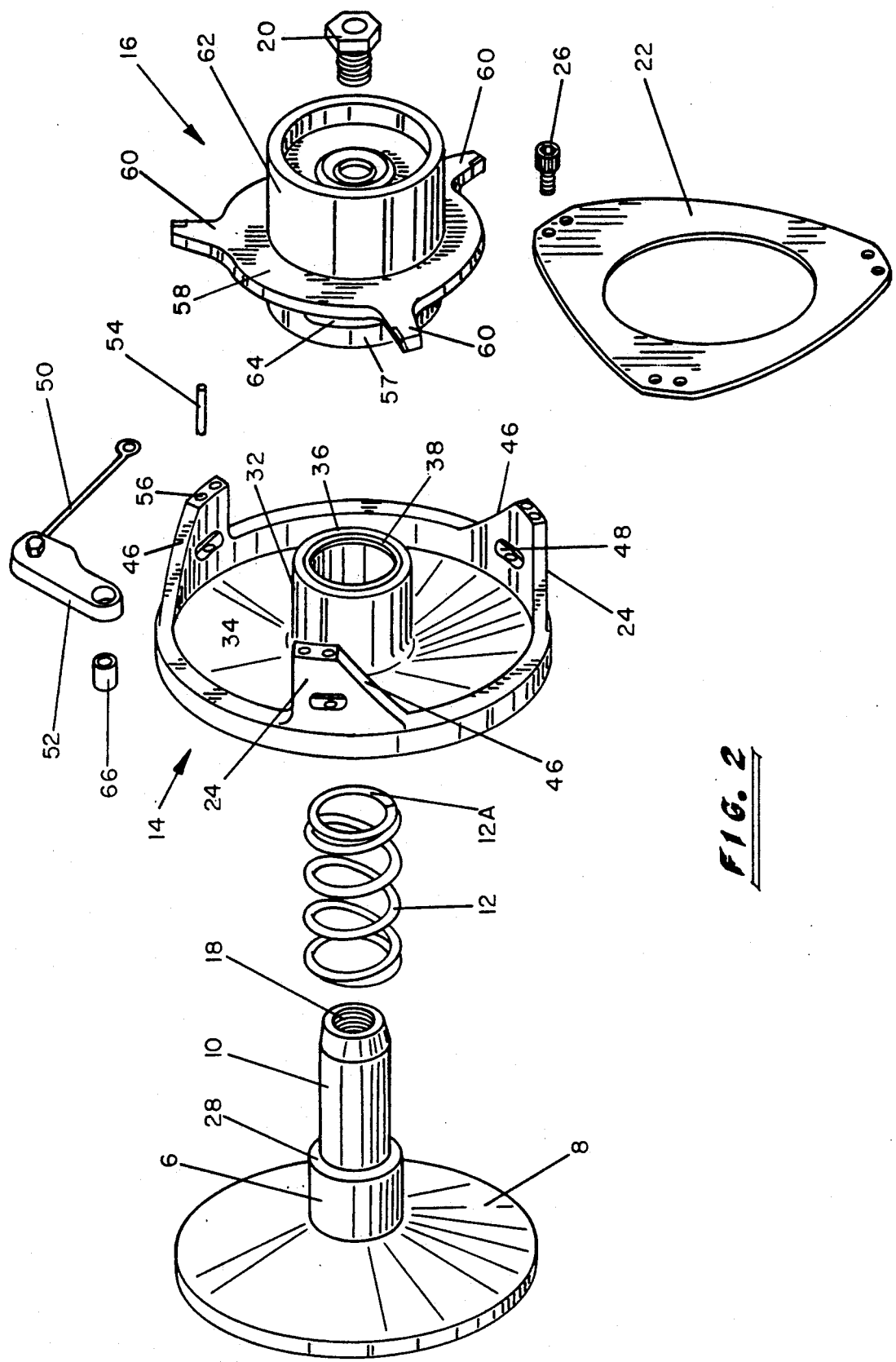
FIG. 2 is a parts drawing showing the components of the clutch of FIG. 1.

The ring 57 has an I.D. of 3 ¾", larger than the O.D. of hub 32 and projects out 1" from the rear surface of plate 58. Ring 56 has three equally spaced elongated slots 64 for receiving weight arms 52 which are pivotally connected to the retainer ring using pivot pins 66. The slots 64 are of sufficient length (about 2 ¾") to allow the weight arm 52 to swing about 20 to 40 degrees. The drive plate 58, as shown, has three equally spaced (and spaced in cooperation with the spacing of shift cams 24) drive lugs 60 projecting out from its periphery about 1¼". As with the shift cams, it does not seem critical to have three lugs, but rather, one can use two, four or more lugs. The number of lugs and shift cams should be equal. Each lug 60 is provided with a replaceable plastic cap or pad 68 to save wear on the lug driving surface. A plastic such as silicone, neoprene, urethane elastomer, and Teflon can be used. The drive cap 62, drive plate 58 and retainer ring 57 are integrally fastened together, as shown in FIG. 2, as by welding or casting as a single piece. Suitable metals include 390 alloy cast aluminum.

The weight arms, as shown, are generally rectangular in shape, made of mild steel, and measure about 3"×⅞"×¼". Other metals, shapes and dimensions can be used; however, it is important that the weight arms be radially biased relative to the axis of the drive shaft in order to obtain the advantages of the present invention.

Figure 5:
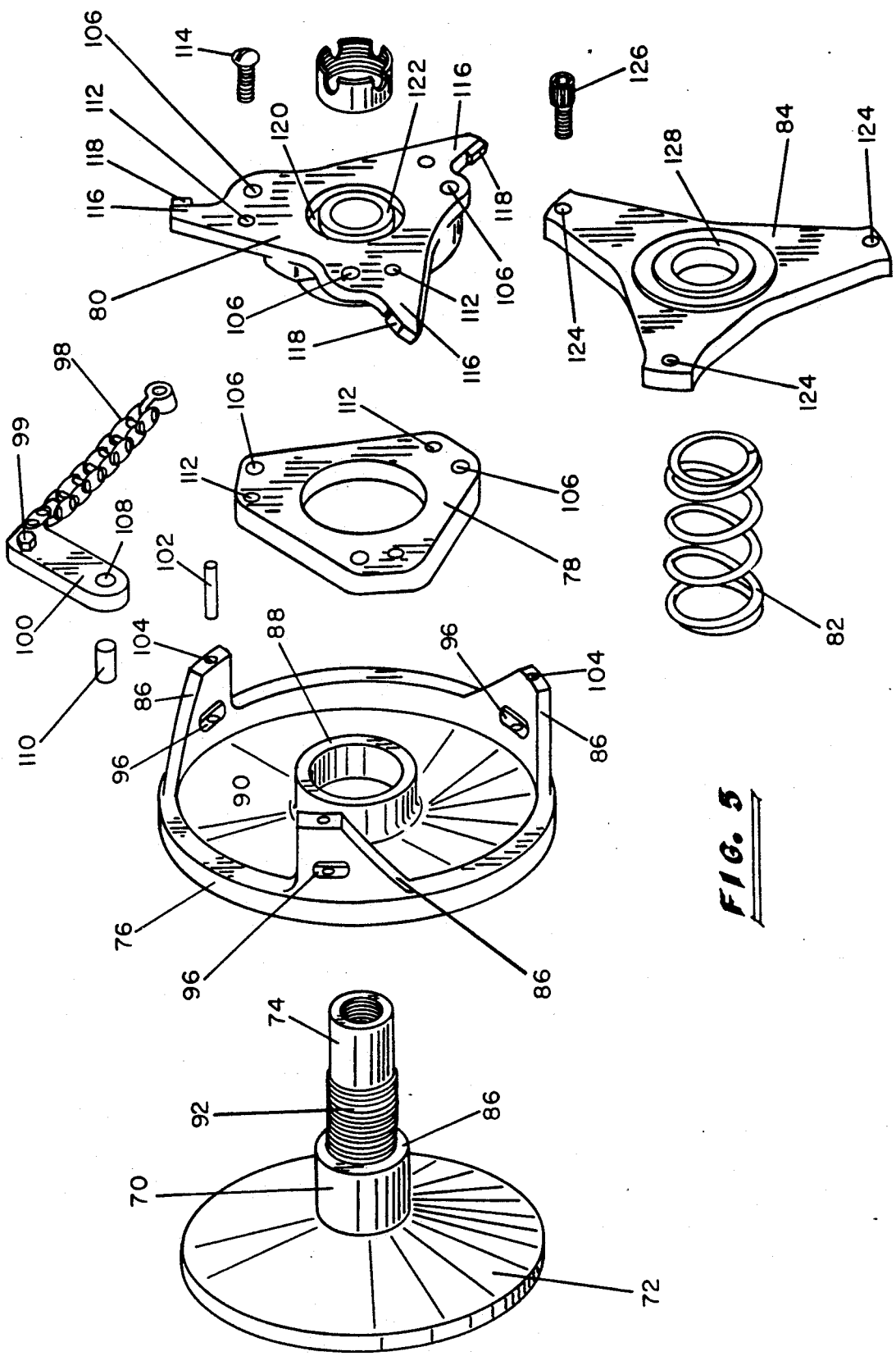
FIG. 5 is a parts drawing showing the components of another embodiment of a V-drive clutch of the present invention.

With reference to FIG. 5, there is shown another embodiment of a V-drive clutch in accordance with the present invention. The clutch is mounted directly on the drive shaft of the vehicle via a bore in the belt idler support member 70 of the stationary or fixed sheave plate 72. As an extension of support member 70, or as an integral part thereof, is hollow shaft member 74 which is of sufficient length and diameter to accommodate and support, in order, movable sheave member 76, weight arm retainer member 78, drive lug plate 80, coil spring 82 and cover or bearing plate 84. Shaft 74 is reduced in diameter as compared to belt support member 70 to form a shoulder 86 against which the bottom surface of retainer member 78 is seated. The shaft is threaded at 92 to receive lug plate 80 after sheave 76 and retainer member 78 are in place.

Movable sheave member 76 has a convex bottom surface, shift cams 86 and a centrally positioned hub 88 fixed at its base to the concave surface 90 of the sheave. Hub 88 is provided with a brass bushing which facilitates sheave plate 76 to slidably move axially toward or away from fixed sheave plate 72 to engage or disengage the v-belt and to rotate around support member 70. The shift cams 86 are fixed to and around and near the periphery of the sheave plate 76 and project outward from the concave surface of the sheave plate. In the embodiment shown, three cams are used. There can be used two, four or more cams also. The cams of sheave member plate 76 are equally spaced around and near the perimeter or circumference of the sheave. The ramp 94 of the cam 86 is at an angle of about 45 degrees, relative to the base thereof, in the embodiment shown. Generally, the angle will be about 35 to 50 degrees. Within and near the base, about centrally positioned, of each shift cam 86 is a slot 96 for receiving the outer end of link chain 98 of the radially disposed weight arm 100. The outer end of the link chain is pivotally held in place in the cam by pivot pin 102 which is inserted via hole 104 in the outer end of the shift cam. In place of the link chain, other attachment means can be used such as a cable or rod.

Next in order is the weight arm retainer member 78 and drive lug plate 80 which collectively can be called a cam follower assembly or spider. The weight retainer member 78 and drive lug plate 80 are provided with holes 106 which are in alignment when the retainer member and the lug plate are in position and joined together. The inner end of weight arm 100 is bored at 108 which is then aligned with hole 106 of the retainer member 78 and the lug plate 80 and pivot pin 110 inserted to pivotally connect the weight arm to the retainer member. Weight arm 100 is bored to receive a nut and bolt 99 which can be used to provide weight adjustment of the weight arm. Lug plate 80 is threadedly affixed to shaft 74 using threads 92. Bores 112 of lug plate 80 and threaded holes of retainer member 78 are aligned and screw 114 installed to securely join the lug plate and retainer member together. Screws 114 are recessed in plate 80. The bottom of lug plate 80 has a hub that spaces the plate away from the top surface of the retainer member 78 a distance sufficient to permit uninterrupted movement of the weight arm 100 and link chain 98. Each drive lug 116 of plate 80 is provided with a replaceable plastic cap or anti-friction pad 118. The top surface of plate 80 is recessed at 120 to cooperatively receive and seat spring coil 82 therein. As an integral part of plate 80 is an internally threaded hub 122 which, as mentioned above, threadedly joins plate 80 to threads 92 of shaft 74. Coil 82 when seated, extends a short distance beyond the end of shaft 74. In installing bearing plate 84, bores 124 are aligned with threaded holes 104 of the movable sheave plate 76, the coil 82 is compressed and screws 126 installed to join the bearing plate and sheave 76 together under tension of the compressed coil. A recessed brass bushing 128 is provided centrally in plate 84 to positively seat coil 82 and to facilitate movement of plate 84 around shaft 74. In this way, axial movement of sheave plate 76 and bearing plate 84 along the axis of shaft 74 is provided under tension of coil 82.

As in the embodiment of FIGS. 1–4, in the embodiment of FIG. 5, the three weight arms 100 (only one shown) are radially biased relative to the axis of the drive shaft.

The advantages of the V-belt drive clutch assemblies of the present invention over the prior art v-belt drive clutch assemblies Cited hereinabove include lighter weight, easier repair and easier manufacture. The clutches of the present invention run much cooler than prior art clutches, which provides longer life for the clutch and improved safety to the vehicle user. The radial weight arms of the clutches of the present invention are not exposed to as much wear and tear as compared to the weight arms of prior art clutches which are positioned parallel to the drive shaft. This advantage permits use of lighter and less expensive components. In case of repairs, parts can be replaced considerably more easily as compared to the prior art clutches.

What is claimed is:

1. A V-drive clutch assembly for a V-belt driven vehicle comprising:
 a fixed sheave plate adapted to be secured to the drive shaft of said vehicle, a hollow belt idler support member centrally affixed to the convex surface of said fixed sheave plate and a hollow shaft member affixed to said idler support member, said shaft member having a diameter less than the diameter of said idler support member and being threaded at its outer end;

a neutral retainer coil spring mounted on said shaft member and bearing against said idler support member under tension;

a movable sheave plate assembly, said assembly being axially movable along the axis of said idler support member in response to the speed of the engine of said vehicle, said sheave plate assembly having a convex surfaced sheave plate which cooperatively, axially moves toward or away from said fixed sheave plate to engage or release said V-belt therebetween, a plurality of shift cam means affixed around the periphery of the concave surface of said movable sheave plate, a centrally positioned hub affixed to the concave surface of said movable sheave plate, said hub being adapted to retain said coil therein and of sufficient internal diameter to move axially along the axis of said idler support member;

a cam follower assembly which cooperatively mates with the hub of said movable sheave plate, said cam follower assembly having weight arm retainer ring means, drive lug plate means adapted to engage said shift cam means and a plurality of weight arms, said lug plate means being affixed to the outer end of said hollow shaft, one end of each weight arm being pivotally connected to said cam means and the other end of the weight arm being pivotally connected to said retainer ring means, said weight arms thereby being radially biased relative to the axis of said drive shaft; and bearing plate means affixed to the outer end of said cam shaft means.

2. The V-drive clutch assembly according to claim 1 wherein said movable sheave assembly has three shift cam means, said lug plate means has three lugs and said cam follower assembly has three weight arms.

3. A V-drive clutch assembly for a V-belt driven vehicle comprising a fixed sheave plate adapted to be secured to the drive shaft of said vehicle, a hollow belt idler support member centrally affixed to the convex surface of said fixed sheave plate and a hollow shaft member axially aligned with and affixed to said idler support member, said shaft member having a diameter less than the diameter of said idler support member and having external threading thereon;

a movable sheave plate assembly, said assembly being axially movable along the axis of said idler support member in response to the speed of the engine of said vehicle, said movable sheave plate assembly having a convex surfaced sheave plate which cooperatively axially moves toward or away from the convex surface of said fixed sheave plate to engage or release said v-belt therebetween, a plurality of shift cam means affixed around the periphery of the concave surface of said movable sheave plate, a centrally positioned hub affixed to the concave surface of said movable sheave plate, said hub having an internal diameter sufficient to permit said movable sheave plate assembly to move axially along the axis of said idler support member;

a cam follower assembly which cooperatively mates with the hub of said movable sheave plate, said cam follower assembly having weight arm retainer means, drive lug plate means, said drive lug plate means having a plurality of drive lugs adapted to engage said cam shafts of said movable sheave plate assembly, and a plurality of weight arms, one end of each weight arm being pivotally connected to said cam shaft and the other end of the weight arm being pivotally connected to said weight arm retainer means, said weight arms thereby being radially biased relative to the axis of said drive shaft, said drive lug plate means being threadedly affixed to said hollow shaft member;

a neutral retainer coil spring mounted around said shaft member;

bearing plate means affixed to the outer end of said cam shaft means, said coil spring being sandwiched between said bearing plate means and said drive lug plate means and under tension.

4. The V-drive assembly according to claim 2 wherein said movable sheave assembly has three shift cam means, said drive lug plate means has three lugs and said cam follower assembly has three weight arms.

* * * * *